United States Patent [19]

Momberg

[11] Patent Number: 4,568,110

[45] Date of Patent: Feb. 4, 1986

[54] MULTIPLE COUPLING WITH LOCKING-BALL INTERLOCK

[75] Inventor: Wolfgang Momberg, Wuppertal, Fed. Rep. of Germany

[73] Assignee: Carl Kurt Walther GmbH & Co. KG, Wuppertal, Fed. Rep. of Germany

[21] Appl. No.: 464,441

[22] Filed: Feb. 7, 1983

[30] Foreign Application Priority Data

Feb. 6, 1982 [DE] Fed. Rep. of Germany ....... 3204116

[51] Int. Cl.[4] ............................................. F16L 35/02
[52] U.S. Cl. ....................................... 285/26; 285/29; 285/316; 285/137.2
[58] Field of Search ....................... 285/27, 28, 29, 24, 285/25, 26, 18, 316, 308, 137 A

[56] References Cited

U.S. PATENT DOCUMENTS 3,214,195 10/1965 Zahuranec et al. .................... 285/27
3,486,556 12/1969 Burgess ............................. 285/26 X

FOREIGN PATENT DOCUMENTS 2146097 10/1972 Fed. Rep. of Germany .

*Primary Examiner*—Richard J. Scanlan, Jr.
*Attorney, Agent, or Firm*—Martin A. Farber

[57] ABSTRACT

A multiple coupling with plate-shaped coupling halves in which the fluid-conducting spigot and hub parts of the individual couplings are fastened. The coupling halves are held pin-centered with respect to each other and detachably to each other in coupling position by a locking-ball interlock such that a plug projection of one coupling half enters into a socket opening of the other coupling half. The plug projection is held in the socket opening by locking balls which can be released by displacement of an interlock sleeve into the open position. The plug projection which is arranged approximately concentrically to the one coupling half is provided at its end with a grip of smaller cross section for a pull member developed preferably in the form of a rope, which passes through the socket opening. The furthest protruding part of the coupling half to be brought into position, namely the plug projection is pulled in essentially in a self-centering manner into the socket opening which forms a guide eye, of the stationary coupling half.

9 Claims, 3 Drawing Figures

MULTIPLE COUPLING WITH LOCKING-BALL INTERLOCK

The present invention relates to a multiple coupling with plate-shaped coupling halves in which the fluid-conducting spigot and hub parts of the individual couplings are fastened, which plate-shaped coupling halves are held pin-centered with respect to each other and detachably to each other in coupling position by a locking-ball interlock, in such a manner that a plug projection of one coupling half enters into a socket opening of the other coupling half and is held there by locking balls which can be released by shifing an interlock sleeve into the open position.

A multiple coupling of this kind is known from West German Pat. No. 21 46 097. Such devices make it possible to cover a system's entire supply needs by a single coupling step. Depending on the conduit cross section of the supply conduits, a considerable load is produced on one coupling half which greatly impairs the raising up of the coupling, particularly in the case of a vertical arrangement. This coupling is equipped with U-shaped members which, while designed as interlock levers, are, however, generally used as a carrying handle for lifting up and bringing into position. To this extent these means are more or less rudimentary. Fixed guide frames are also known, to be sure, but they are bulky.

The object of the present invention is to develop a multiple coupling of this kind in a manner which is simple to manufacture and advantageous in use so that, while dispensing with a bulky guide-rail frame which occupies a lot of space, easy operation is obtained with a nevertheless precise mating of the coupling halves.

This object is achieved by the invention as set forth in the claims.

As a result of this development the operation of a multiple coupling of the type described is facilitated. The furthest protruding part of the coupling halves which are to. be brought together, namely the plug projection, is introduced practically in self-centering fashion into the socket opening of the stationary coupling half. The stationary coupling half thus advantageously represents a guiding eye for the pull member which is coupled via a grip to the plug projection. In addition to this there is the advantage that the coupling region is also the interlock zone. The multiple coupling can advantageously be developed as a central system and therefore be provided with individual couplings which are grouped concentrically to the central plug projection. As a pull member it is possible to use a rope so that even large differences in level can be overcome with only a small amount of space being required; the rope can be actuated by means of a winch and wound up in space-saving fashion. The pulling-in via the socket opening imparts proper alignment at an early moment to the bundle of conduits, which are generally contained in a hose, when pulled up into the higher coupling position. To this extent the plug projection can also be advantageously utilized as a centering pin for the multiple coupling. In the case of individual couplings of different designs or ones of different purpose, this version is thus to be counteracted by an eccentrically arranged orientation pin of the one coupling half which enters in form-fitting manner into an opening in the other coupling half. Upon the pulling-in of the plug projection into the socket opening the operator need merely see to it that a certain pre-alignment is maintained. The turning forces which are to be applied here are, however, small since the load acts practically exclusively on the pull member. The means which bring about the releasing of the multiple coupling are also easy to operate insofar as the other coupling half is provided, for actuation of the interlock sleeve, with secant-shaped cutouts into which there engage arms of a double-armed release lever which are arranged in fork shape. In order to keep the fluid-conducting conduits themselves free of tensile stresses, a connection is selected in the manner that coaxially to the plug projection on the opposite side of the plate of the coupling half a central holder is provided for the fluid conduits which are combined into a bundle. The actual taking up of the load can be effected, for instance, on a centrally located rope of corrosion-resistant material, such as nylon. The grip is advantageously formed by a rapid-coupling half, the corresponding mating half being seated at the end of the pull member. Means of this type have the advantage of rapid, convenient spigot association. By the construction with rotary symmetry of corresponding couplings the freedom of rotation can also be retained. In order to keep the ingerlock sleeve which connects the coupling halves to each other itself substantially free of load while optimizing the taking-up of the load via the locking balls, a development is used such that the resting points of the interlock balls are opposite each other on a diametral line of the interlock balls which is at an acute angle to the longitudinal central axis of the plug projection. In this connection it is advantageous for the support-diameter lines of all interlock balls to intersect in a cone apex which lies in the central axis of the plug projection. In that case a support which is excellently adapted to the central system of the multiple coupling is obtained, while making possible the displacement of the interlock sleeve, which is almost without load, by the application of small actuating forces.

With the above and other objects and advantages in view, the present invention will become more clearly understood in connection with the detailed description of a preferred embodiment, when considered with the accompanying drawings, of which:

FIG. 3 shows a proposed illustrative use thereof on a drill tower, a drill platform or the like.

Figure 1:
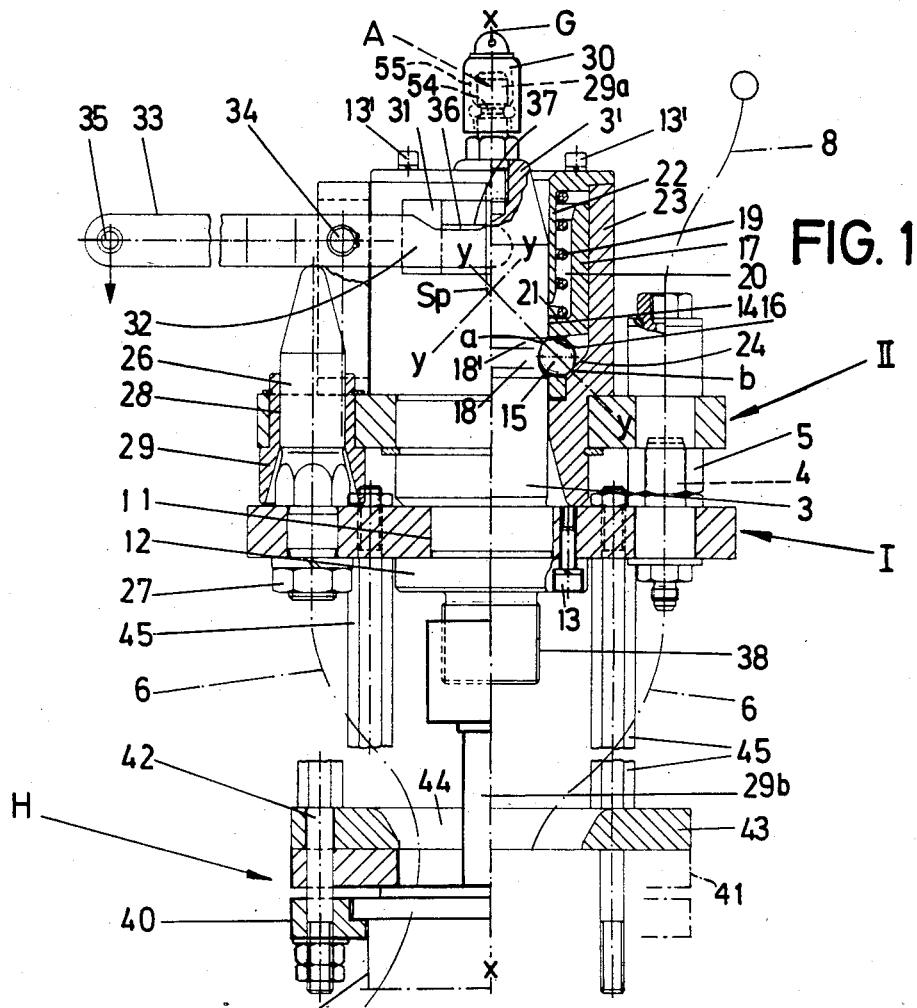
FIG. 1 shows a partial vertical section of a multiple coupling in a coupling position incorporating one embodiment of the invention.
Figure 2:
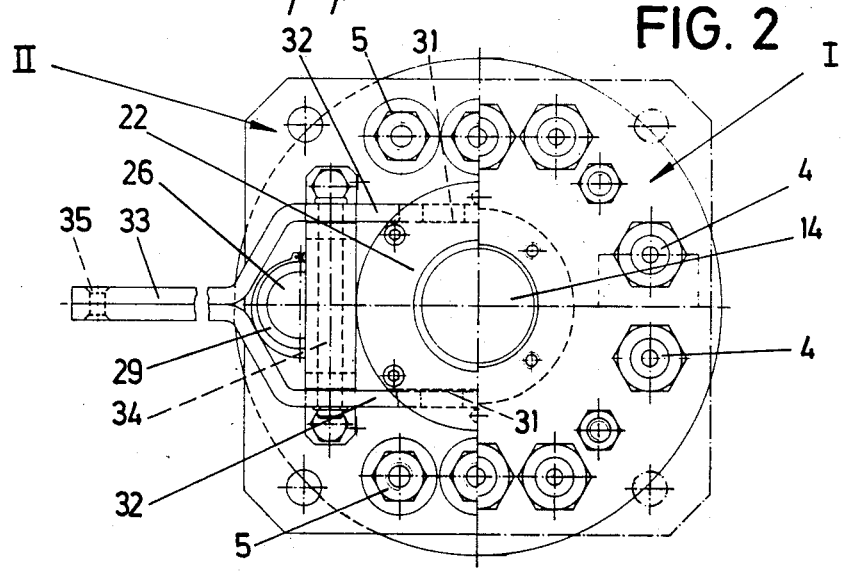
FIG. 2 is a top view thereof in different planes.
Figure 3:
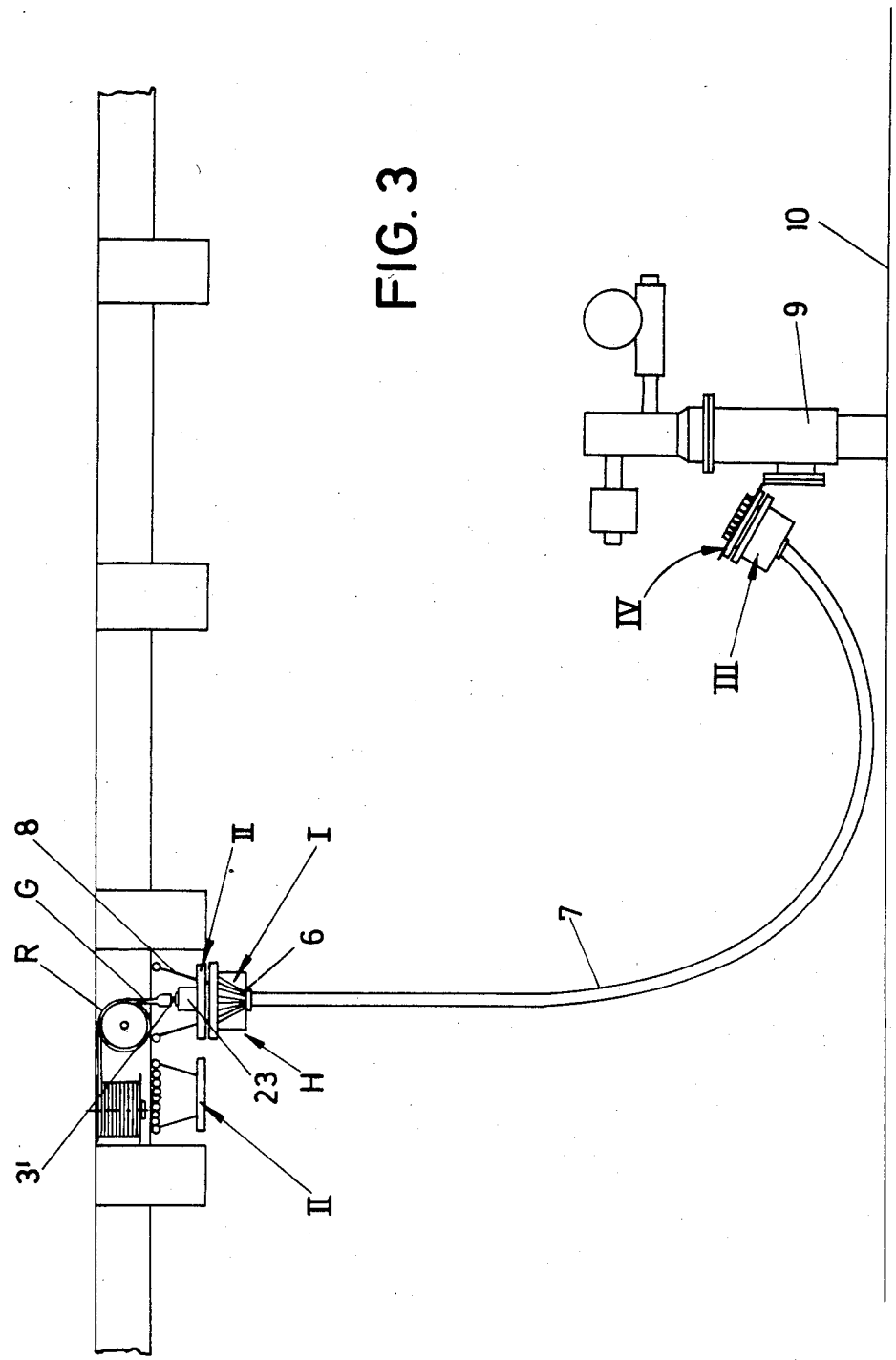

The multiple coupling shown comprises two plate-shaped coupling halves I and II. The plates are of circular and/or square contour.

One coupling half I bears in its center an upward-directed cylindrical plug projection 3 or coupling pin which is frustoconical in the region of its head. Grouped concentrically around it are spigot parts 4 which can be connected with correspondingly arranged hub parts 5 of the other coupling half. They form individual couplings of different type and size.

The spigot parts 4 are provided on the bottom of the one coupling half I with fluid conduits 6 which are brought together as a bundle within a hose 7.

A number of corresponding supply conduits 8 extend from the top of the other coupling half II. The conduits 8 lead to the individual sources of fluid.

The other end of the hose 7 opens into a coupling half III which is similar to the coupling half I and can be connected to a stationary coupling half IV. The coupling half IV is seated on the base of a drill rig 9 of a drilling platform 10 and conducts the required fluids to the drill rig 9.

The plug projection 3 which is developed as a turned part, extends through a central borehole 11 in the plate of the one coupling half I. A fastening flange 12 extends below the edge of said borehole. The screws which hold the fastening flange 12 are designated 13.

The plug projection 3 enters, for coupling engagement, in a socket opening 14 of corresponding cross section in the other coupling half II. In the region of the joint between the plug projection 3 and the socket opening 14 there are disengagable locking balls 15. The locking balls 15 rest in radially directed conical bores 16 of a displaceably guided spring loaded interlock sleeve 17, the motion of which is limited by stops. The conical bores 16 are so dimensioned that the locking balls 15 cannot fall into the socket opening 14 but emerge inward only to the extent necessary to bring about the interlock position. In this position the balls 15 extend into an annular groove 18—of the plug projection 3, which annular groove 18 has a trapezoidal shape as seen in cross section and and lies at mid-height of the plug projection 3.

The interlock sleeve 17 is under the load of a helical compression spring 19 seated in a spring chamber 20 formed by milling-out the interlock sleeve 17. The milling-out is effected in such a manner that a supporting shoulder 21 is present for engaging one end of the compression spring 19. The other end of the compression spring rests on the outwardly directed collar of a bushing 22 which cooperates in forming the socket opening 14. This bushing 22 is screwed onto a housing 23 of rotational symmetry which forms the guide for the interlock sleeve 17. The screws are designated 13'.

The compression spring 19 acts on the interlock balls 15 indirectly in the direction of interlock engagement. The support points a and b of the interlock balls 15 lie on a diametral line y—y which is directed at an acute angle (45°) to the longitudinal center axis x—x of the plug projection 3. The support point a is formed in this connection by the upper flank 18' of the annular groove 18 and the lower support point b of a substantially parallel-directed flank 24 of the other socket part, more specifically the housing 23. The flanks 18' and 24 extend perpendicular to the support-diameter line y—y. The interlock sleeve 17 itself is in this connection kept practically free of load. With due consideration of the fact that the interlock balls 15 are arranged in close sequence in a rotating series, the support-diameter lines y—y of all interlock balls 15 intersect at a "conical vertex" Sp which lies in the center axis x—x of the plug projection 3.

Aside from the plug projection 3 of centering action another projectile-like pointed orientation pin 26 can be provided decentrally in connection with differently developed individual couplings in order to ensure the raising of the coupling half I in proper operating form. The orientation pin 26 is also directed upwards and at its rear screws, at 27, on the rear side of the one coupling half I. For the form-fitting entrance of this upward-directed orientation pin 26 the other coupling half II forms an opening 28 formed by a bushing 29 which sits in a borehole in the plate of the coupling half. An entrance side of the bushing 29 is widened in funnel shape.

The plug projection 3 is provided at its free upper end 3' with a grip A of smaller cross section for a pull member G, developed preferably in the form of a rope, which passes through the socket opening 14. The pull member G can be wound by means of a winch to form a coil R. The winch is located, for instance, below the deck of the platform 10 and therefore in the region of the supply conduits 8. The plug projection 3 is in this way pulled into the correct operational coupling position through the socket opening 14, forming in effect a guide eye, of the stationary coupling half II. Since the plug projection 3 is of a length which corresponds to that of the socket opening 14, the grip A is then free for possible releasing.

The grip A is formed by a rapid coupling half 29a which is screwed into the plug projection 3. Here the end of the pull member G represents the mating half 30 of this rapid coupling and therefore, for example, the socket half 30 for the pin-shaped rapid coupling half 29a formed with a groove 54, which socket half can be secured via an interlock sleeve 55 (e.g. generally comparable to the interlock sleeve 17 cooperating with the annular groove 18 on the plug projection 3 which cooperates with a set of locking balls 15). These coupling halves are of rotational symmetry so that free rotation is assured. The pull member G acts via an eye.

In order to release the coupling connection it is merely necessary to connect the grip A (coupling half 29a) again to the plug projection 3 (if previous releasing has taken place) and to shift the interlock sleeve 17 in opposition to the force of the compression spring 19. In this way the interlock balls 15 are shifted outward from the region of the flank 18', of locking action, of the annular groove 18. The interlock balls 15 then enter into a radially located outwardly directed annular escape space behind the bore 16. For accessibility to the sleeve 17, the housing 23 is provided on diametrically opposite sides with secant shaped window-forming cutouts 31 into which there engage arms 32 of a double-armed release lever 33 which are arranged as a fork. The release lever swings around a fixed horizontally aligned pivot pin 34 of a bearing block. The free end of the double-armed release lever 33, which functions as a handle, has an eye 35 for the application of a means for pulling. The direction of pull is indicated by an arrow in FIG. 1.

The interlock sleeve 17 is also provided with a secant-shaped recess 36 in the region of the cutout 31. In this way there is produced a horizontally directed shoulder 37 onto which the top side of the arms 32, arranged as a fork, can engage. The shoulder 37 is spaced as is necessary for the stroke in the base position below the cover of the cutout 31.

The hose end of the plug projection 3 continues into a threaded bolt 38. A central rope 29b is connected by a screw means (e.g. a cap nut) to the bolt 38. The rope 29b passes centrally through the hose 7 which carries the fluid conduits 6. The free end of the hose 7 is formed with a collar 7'. The collar 7' and the rope 29b are part of a holder H which leaves the fluid conduits 6 free of stress. The collar 7' is clamped in grip-like fashion between a jaw 40 and a mating holding plate 41. The entire unit is suspended, held via screws 42, from a plate 43 with central opening 44. The edge of said opening 44 is of funnel shape corresponding to the course of the bundling of the fluid conduits 6. The plate 43 hangs from the coupling half I, via column pieces 45 screwed to the plate of the one coupling half I. There are a total of four such column pieces 45 so that a balanced fixing of the plate 43 is obtained. The distance between the plate of the one coupling half I and the plate 43 is such that the rope 29b can be conveniently fastened, for instance by the use of a cap nut, to the screw-bolt 38.

The unlocking may also take place mechanically or pneumatically. Furthermore, manual operation is possible as previously without actuation of the winch (gripping of the column pieces 45).

I claim:

1. In a multiple coupling with plate-shaped coupling halves in which fluid-conducting spigots and hub parts of individual couplings are fastened, the plate-shaped coupling halves being pin-centered with respect to each other and held detachably to each other in coupling position by a locking-ball interlock by a plug projection of one coupling half entering into a socket opening of the other coupling half and being held there by locking balls which are releaseable from a locking position into an open position by displacing an interlock sleeve, the improvement wherein the plug projection is arranged substantially concentric to said one coupling half, an end of the plug projection having a grip means of smaller cross section than that of the plug projection, said grip means for gripping a pull member adapted to pass through the socket opening, a release lever having at least two lever arms is pivoted to the other coupling half, and the other coupling half has secant-shaped cutouts for engagement of the lever arms to actuate movement of the interlock sleeve.

2. Th multiple coupling according to claim 1 wherein the lever arms of said release lever are arranged in the form of a fork.

3. The multiple coupling according to claim 1, wherein said interlock sleeve is formed with secant-shaped recesses adjacent said cutouts forming horizontally directed shoulders, said lever arms are engageable against shoulders.

4. The multiple coupling according to claim 3, wherein said shoulders are spaced below a cover of said cutouts on said other coupling half.

5. In a multiple coupling with plate-shaped coupling halves in which fluid-conducting spigots and hub parts of individual couplings are fastened, the plate-shaped coupling halves being pin-centered with respect to each other and held detachably to each other in coupling position by a locking-ball interlock by a plug projection of one coupling half entering into a socket opening of the other coupling half and being held there by locking balls which are releaseable from a locking position into an open position by displacing an interlock sleeve, the improvement wherein the plug projection is arranged substantially concentric to said one coupling half, an end of the plug projection having a grip means of smaller cross section than that of the plug projection, said grip means for gripping a pull member adapted to pass through the socket opening, fluid conduits respectively extending from the spigots, and a central holder for combining the fluid conduits into a bundle, said central holder being provided coaxial to the plug projection and away from said one coupling half.

6. The multiple coupling according to claim 5, wherein said one coupling half includes a plate having opposite sides and the plug projection extends away from one side of the plate of said one coupling half and the central holder is spaced away from the opposite side of the plate of said one coupling half.

7. In a multiple coupling with plate-shaped coupling halves in which fluid-conducting spigots and hub parts of individual couplings are fastened, the plate-shaped coupling halves being pin-centered with respect to each other and held detachably to each other in coupling position by a locking-ball interlock by a plug projection of one coupling half entering into a socket opening of the other coupling half and being held there by locking balls which are releaseable from a locking position into an open position by displacing an interlock sleeve, the improvement wherein the plug projection is arranged substantially concentric to said one coupling half, an upper end of the plug projection having a grip means of smaller cross section than that of the plug projection, said grip means for gripping a pull member adapted to pass through the socket opening, the plug projection has a longitudinal central axis and an annular groove having an upper flank on a side of the annular groove toward said upper end of the plug projection having said grip means and a lower flank on a side of the annular groove away from said upper end of the plug projection having said grip means, and the interlock balls in said locking position each have support points on said upper flank of said annular groove and on said interlock sleeve adjacent said lower flank, the support points of each of the interlock balls lie diametrically opposite each other on a diametrical line of the interlock balls which diametrical line is at an acute angle to the longitudinal central axis of the plug projection.

8. The multiple coupling according to claim 7, wherein the diametrical support lines of all said interlock balls intersect in a conical vertex which lies in the longitudinal central axis of the plug projection.

9. In a multiple coupling with plate-shaped coupling halves in which fluid-conducting spigots and hub parts of individual couplings are fastened, the plate-shaped coupling halves being pin-centered with respect to each other and held detachably to each other in coupling position by a locking-ball interlock by a plug projection of one coupling half entering into a socket opening of the other coupling half and being held there by locking balls which are releaseable from a locking position into an open position by displacing an interlock sleeve, the improvement wherein the plug projection is arranged substantially concentric to said one coupling half, an end of the plug projection having a grip means of smaller cross section than that of the plug projection, said grip means for gripping a pull member adapted to pass through the socket opening, said grip means is formed by a first rapid coupling half, a mating second rapid coupling half constituting one end of the pull member forms a socket which is releasably couplable to said first rapid coupling half, the latter extending into said socket, said grip means is formed with an annular groove, and an interlock sleeve means operatively cooperating with said socket and said annular groove for rapidly coupling said socket to said grip means.

* * * * *